(12) United States Patent
Gierl et al.

(10) Patent No.: US 9,374,117 B2
(45) Date of Patent: Jun. 21, 2016

(54) STEREO DECODING SYSTEM

(75) Inventors: Stefan Gierl, Karlsruhe (DE);
Christoph Benz, Ohlsbach (DE);
Andreas Körner, Waldbronn (DE);
Karl-Anton Becker, Karlsbad (DE)

(73) Assignee: Harmon Becker Automotive Systems GmbH, Karlsbad (DE)

(*) Notice: Subject to any disclaimer, the term of this patent is extended or adjusted under 35 U.S.C. 154(b) by 394 days.

(21) Appl. No.: 13/557,028

(22) Filed: Jul. 24, 2012

(65) Prior Publication Data
US 2013/0028425 A1 Jan. 31, 2013

(30) Foreign Application Priority Data

Jul. 25, 2011 (EP) ..................................... 11175187

(51) Int. Cl.
*H04B 1/16* (2006.01)
(52) U.S. Cl.
CPC .................................. *H04B 1/1676* (2013.01)
(58) Field of Classification Search
CPC .... H04B 1/676; H04B 1/1646; H04B 1/1661; H04B 1/166911
USPC .................... 381/1, 12, 13, 2, 3, 11
See application file for complete search history.

(56) References Cited

U.S. PATENT DOCUMENTS

| | | | |
|---|---|---|---|
| 4,737,991 A * | 4/1988 | Sugai et al. ..................... 381/13 |
| 7,046,811 B1 | 5/2006 | Wildhagen |
| 2007/0058817 A1 | 3/2007 | Hendrix et al. |

FOREIGN PATENT DOCUMENTS

| | | |
|---|---|---|
| CN | 101855917 A | 10/2010 |
| CN | 101989426 A | 3/2011 |
| DE | 4445 983 A1 | 6/1996 |
| WO | WO 2008/087577 A1 | 7/2008 |
| WO | 2009/010116 A1 | 1/2009 |

OTHER PUBLICATIONS

European Search Report from corresponding European patent application No. 11175187.1-2411, 6pp., Dec. 19, 2011.
Office action for foreign counterpart application CN 201210260685.4, dated Feb. 8, 2014, 6 pages.

* cited by examiner

*Primary Examiner* — Ping Lee
(74) *Attorney, Agent, or Firm* — Brooks Kushman P.C.

(57) ABSTRACT

A system for decoding a stereo multiplex signal, including one or more devices operable to convert the stereo multiplex signal into a sum signal (L+R) and a difference signal (L−R). The sum signal and the difference signal may be derived from a left stereo signal (L) and right stereo signal (R). The system may also be operable to determine a first transfer function $H_L(f)$ and a second transfer function $H_R(f)$ from the sum signal (L+R) and the difference signal (L−R). Further, the system may be operable to filter the sum signal (L+R) according to the first transfer function to provide the left stereo signal (L), and filter the sum signal (L+R) according to the second transfer function to provide the right stereo signal (R).

20 Claims, 6 Drawing Sheets

STEREO DECODING SYSTEM

BACKGROUND OF THE INVENTION

1. Priority Claim.

This application claims the benefit of priority from European Patent Application No. 11 175 187.1-2411, filed Jul. 25, 2011, which is incorporated by reference.

2. Technical Field.

The invention relates to systems for decoding stereo signals.

3. Related Art

Since the 1950s, systems have been incorporating stereo into FM radio signals. Various systems have been tried and tested. Through such trials and tribulations, a common denominator has stayed intact, which is, ensuring stereo broadcasts remain compatible with mono receivers. Because of this denominator, left (L) and right (R) channels are algebraically encoded into sum (L+R) and difference (L−R) signals. A mono receiver may use just the sum signal so the listener will hear both channels through a loudspeaker. A stereo receiver will add the difference signal to the sum signal to recover the left channel, and subtract the difference signal from the sum to recover the right channel.

Due to reception interference, such as adjacent channel interference, multi-path interference or the like, a difference signal (L−R) which is modulated with the 38 kHz carrier (subcarrier) signal may be more distorted than a sum signal (L+R). A common approach to reducing or suppressing reception interference is to switch to a monaural reproduction mode if the signal quality of the stereo signal falls below a certain level. However, in a monaural reproduction mode, the less distorted sum signal (L+R) is reproduced on both channels to the effect that the aural impression of a listener deteriorates.

SUMMARY

A system for decoding a stereo multiplex signal, including one or more devices operable to convert the stereo multiplex signal into a sum signal (L+R) and a difference signal (L−R), where the sum signal and the difference signal are derived from a left stereo signal (L) and right stereo signal (R). The device may also be operable to determine a first transfer function $H_L(f)$ and a second transfer function ($H_R(f)$) from the sum signal (L+R) and the difference signal (L−R). Further the device may be operable to filter the sum signal (L+R) according to the first transfer function to provide the left stereo signal (L), and filter the sum signal (L+R) according to the second transfer function to provide the right stereo signal (R).

For example, the system for decoding a stereo multiplex signal may include a stereo decoder that converts the stereo multiplex signal into a sum signal (L+R) and a difference signal (L−R). The system may also include a first filter that is connected to the stereo decoder and that is operable to filter the sum signal (L+R) according to a first transfer function to provide a left stereo signal (L), and a second filter that is connected to the stereo decoder and that is operable to filter the sum signal (L+R) according to a second transfer function to provide a right stereo signal (R). Further, the system may include a filter control unit that is connected to the stereo decoder and that is operable to control the first filter and the second filter by providing control signals representing the first transfer function and the second transfer function, respectively.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The stereo decoding system (also referred to as the SDS) may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
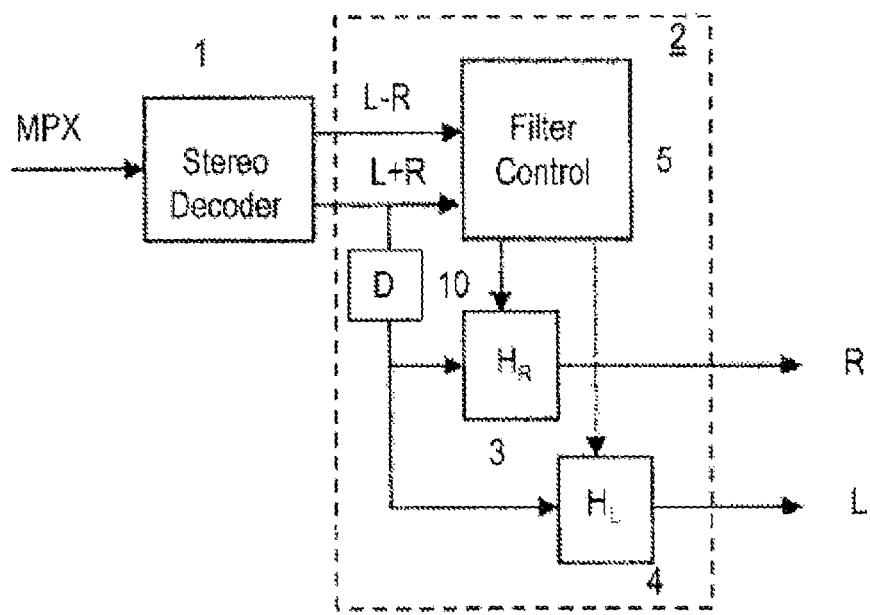
FIG. 1 is a block diagram of an example aspect of the SDS.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

Described herein is a system for decoding a stereo multiplex signal (also referred to as the stereo decoding system or the SDS), including one or more devices operable to convert the stereo multiplex signal into a sum signal (L+R) and a difference signal (L−R), where the sum signal and the difference signal are derived from a left stereo signal (L) and right stereo signal (R). The device(s) may also be operable to determine a first transfer function $H_L(f)$ and a second transfer function ($H_R(f)$) from the sum signal (L+R) and the difference signal (L−R). Further the device(s) may be operable to filter the sum signal (L+R) according to the first transfer function to provide the left stereo signal (L), and filter the sum signal (L+R) according to the second transfer function to provide the right stereo signal (R).

For example, the SDS may include a stereo decoder that converts the stereo multiplex signal into a sum signal (L+R) and a difference signal (L−R). The SDS may also include a first filter that is connected to the stereo decoder and that is operable to filter the sum signal (L+R) according to a first transfer function to provide a left stereo signal (L), and a second filter that is connected to the stereo decoder and that is operable to filter the sum signal (L+R) according to a second transfer function to provide a right stereo signal (R). Further, the SDS may include a filter control unit that is connected to the stereo decoder and that is operable to control the first filter and the second filter by providing control signals representing the first transfer function and the second transfer function, respectively.

Furthermore, as mentioned above, one approach to reducing or suppressing reception interference may be to switch to a monaural reproduction mode if the signal quality of the stereo multiplex signal falls below a certain level. In the monaural reproduction mode, the less distorted sum signal may be reproduced on both channels to the effect that the aural impression of a listener deteriorates. To limit such deterioration, the SDS may switch to the stereo mode according to aspects of the SDS described herein.

FIG. 1 shows an example aspect of the SDS, where a stereo multiplex signal (MPX) (which may include a baseband stereo multiplex signal) may be supplied to an arrangement for decoding a stereo multiplex signal, hereinafter being referred to as stereo decoder 1. The stereo multiplex signal (MPX) may include baseband sum and difference signals (L+R) and (L−R) of left and right stereophonic signals (L) and (R), respectively. The sum signal (L+R) may be located in a frequency range from 0 to 15 kHz, the difference signal (L−R) may be double sideband amplitude modulated (AM) on a suppressed sub-carrier of 38 kHz and covering a frequency range of 23 to 53 kHz. An amplitude level of a difference signal may correspond to half of an amplitude level of a respective sum signal. The stereo multiplex signal (MPX) also may include a 19 kHz stereo pilot signal that may serve as a reference frequency during the regeneration of a local 38 kHz mixing carrier. The stereo multiplex signal (MPX) may be coupled through parallel stereo sum and difference signal paths to a disentanglement unit 2. A low pass filter (not shown) that may select the baseband sum signal (L+R) may be included in a sum signal path preceding an input of the disentanglement unit 2. The stereo decoder 1 may generate the sum signal (L+R) and the difference signal (L−R) from the stereo multiplex signal (MPX).

The disentanglement unit 2 may include filter 3, filter 4, and a filter controller 5. The filters 3 and 4 may include transfer functions $H_R$ and $H_L$, respectively, and may receive the sum signal (L+R) from the stereo decoder 1. The filter controller 5, which may be connected to filters 3 and 4 and stereo decoder 1, may calculate filter coefficients for the filters 3 and 4, respectively, from the sum signal (L+R) and the difference signal (L−R). The filter controller 5 may also supply the filter coefficients to the filters 3 and 4, respectively, in order to control the respective transfer functions $H_R$ and $H_L$. In controlling these filters, the filter 3 may filter out the signal (R) and the filter 4 may filter out the signal (L) from, for example, the sum signal (L+R). The filter controller 5 together with the filters 3 and 4 may form two adaptive filters, for example.

Accordingly, the example aspect of the SDS shown in FIG. 1 may decode the stereo multiplex signal (MPX) that includes the sum signal (L+R) and a difference signal (L−R) of the left stereo signal (L) and the right stereo signal (R) by converting the stereo multiplex signal (MPX) into the sum signal (L+R) and the difference signal (L−R). Further, the transfer functions $H_R$ and $H_L$ may facilitate calculation of the sum signal (L+R) and the difference signal (L−R), and filtering of the sum signal (L+R) according to the transfer function $H_L$ to provide the left stereo signal (L) and according to the second transfer function $H_R$ to provide the right stereo signal (R).

For example, when signal quality is low (for example, a noise level or signal strength does not satisfy a predetermined criteria), information contained in the multiplex signal (MPX) may be extracted from the sum (L+R) and the difference (L−R) signals by using correlation functions or related power density spectra as a basis to calculate the transfer functions $H_R$ and $H_L$ from the sum signal (L+R) and the difference signal (L−R).

For example, the following may be assumed:
x(t) represents the sum signal (L+R) and y(t) represents the difference signal (L−R);
X(f) and Y(f) are signal spectra of x(t) and y(t), respectively;
$l_{xx}(\tau)$ and $l_{yy}(\tau)$ are auto-correlation functions of x(t) and y(t), respectively;
$l_{xy}(\tau)$ is the cross-correlation function of x(t) and y(t);
$L_{xx}$, $L_{yy}$, and $L_{xy}$ are power density spectra of $l_{xx}(\tau)$, $l_{yy}(\tau)$ and $l_{xy}(\tau)$, respectively;
r(t) represents the signal (R) and l(t) represents the signal (L); and
R(f) and L(f) are signal spectra of r(t) and l(t).

For the spectra R(f) and L(f) the following applies:

$$H_R(f) = 1 - \frac{L_{xy}}{2L_{xx}} + \sqrt{\frac{\left(\frac{L_{xy}}{L_{xx}} - 2\right)2 - 3 - \frac{L_{yy}}{L_{xx}} + \frac{4L_{xy}}{L_{xx}}}{4}} \quad (3)$$

$$H_R(f) + H_L(f) = 1 \quad (4)$$

$$L(f) = H_L(f) \cdot X(f) = (1 - H_R(f)) \cdot X(f) \quad (5)$$

With respect to some aspects of the SDS, even heavily distorted signals may provide a spatial sound impression. For example, the sum signal (L+R) may be used, and this less distorted signal may form a basis for sound reproduction in the SDS. Further, distortions occurring in the difference signal (L−R) may not appear in the signals (R) and (L), when using the SDS.

Figure 2:
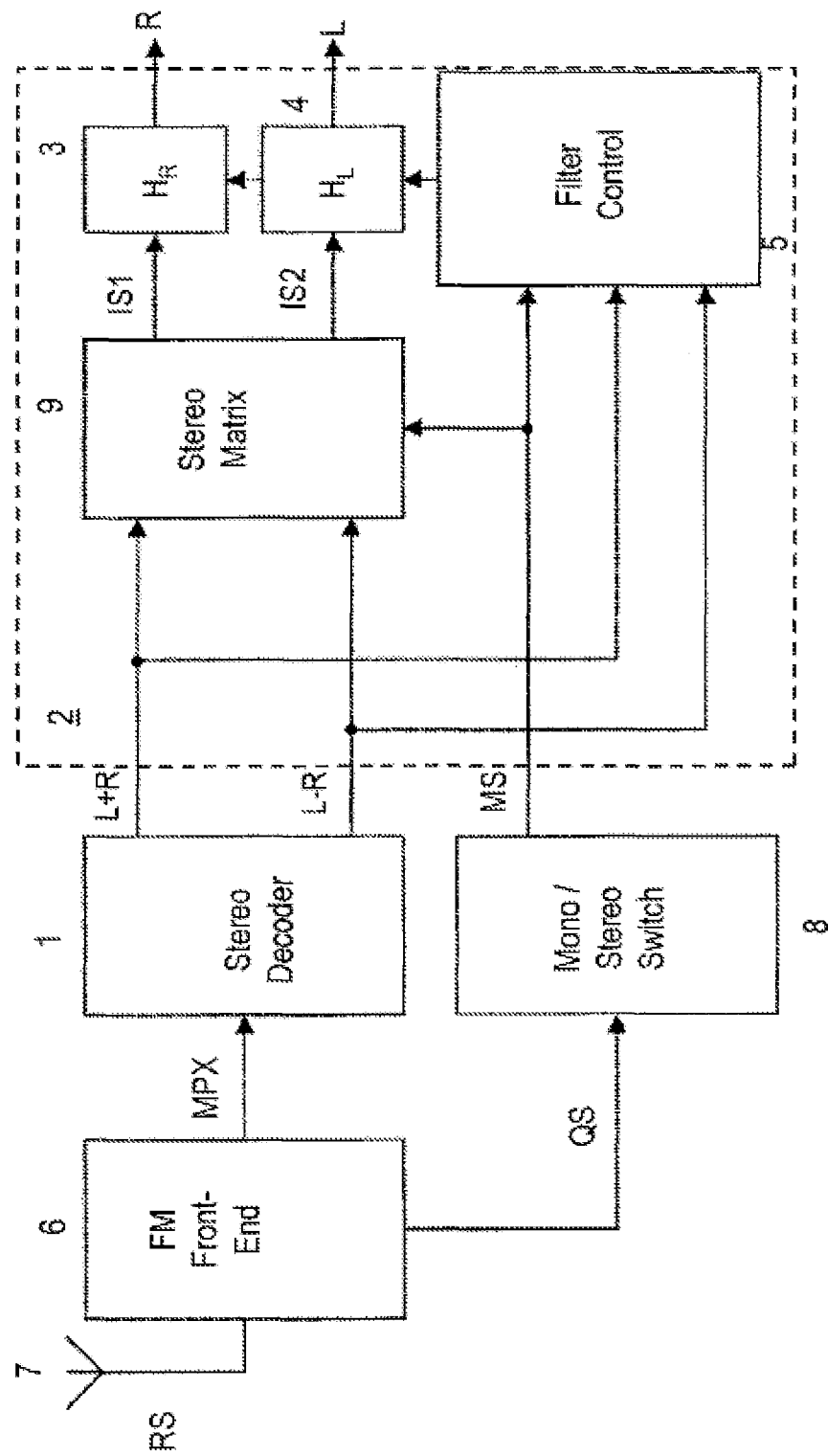
FIG. 2 is a block diagram of an example receiver system employing an example aspect of the SDS, serially.

FIG. 2 shows an example receiver system employing an example aspect of the SDS, serially. This aspect may also include stereo/mono switching. A frequency modulation (FM) stereo receiver front end (referred to as the FM front end 6) may include an input to which a frequency modulated radio frequency (RF) reception signal (RS) may be inputted from an antenna 7. The FM front end 6 (details not shown in the drawings) may include an RF input amplifier and a tuning section amplifying a RF-FM reception signal and converting it into an intermediate frequency (IF) signal. The FM front end 6 may also include an IF section for selectively amplifying and limiting an IF-FM signal. Further, the FM front end 6 may include an FM discriminator for detecting an FM modulation signal of the IF-FM signal. In one aspect, the IF-FM signal may include the stereo multiplex signal (MPX), and may be supplied from the FM front end 6 to the stereo decoder 1. The FM front end 6 also may supply a quality signal (QS) that may include a measurement of signal strength of a received signal, a measurement of noise level contained in the received signal, and/or the like. A mono/stereo switch 8 may evaluate the quality signal (QS) and may provide, based on the quality signal (QS), a mode control signal (MS) that indicates quality of the received signal (RS). The mode control signal (MS) may also indicate whether the received signal (RS) includes a stereophonic or a monaural sound reproduction (such as reproductions in a stereo mode or a mono mode, respectively). The mode control signal (MS) may be supplied to the filter controller 5 and to a stereo matrix unit 9 that may also receive the sum signal (L+R) and the difference signal (L−R). Based on such input, the stereo matrix unit 9 may matrix the sum signal (L+R) and the difference signal (L−R) into matrix decoded signals IS1 and IS2. The matrix decoded signals IS1 and IS2 relate to the mode control signal in the following manner. Where the mode control signal (MS) includes a reproduction in a stereo mode, IS1=L and IS2=R; and where the mode control signal (MS) includes a reproduction in a mono mode, IS1=(L+R)/2 and IS2=(L+R)/2. Furthermore, the filters 3 and 4 may be controlled by the filter controller 5 based on the mode control signal (MS) such that where the mode control signal (MS) includes a reproduction in a stereo mode, $H_R$ and $H_L$ are both neutral (for example, $H_R$=1, and $H_L$=1), and where the mode control signal (MS) includes a reproduction in a mono mode, $H_R$ and $H_L$ are adapted to filter out right signal (R) and left signal (L).

Further, when the received RF-FM signal is of sufficient quality (such as including a sufficient signal strength and noise level with respect to a predetermined criteria), the system operates in a manner such that the stereo matrix unit 9 outputs the stereo signals (L) and (R) passing the filters 3 and 4 unchanged. However, when the quality of the received RF-FM signal (RS), as indicated by quality the signal (QS), deteriorates to an insufficient quality (which may be predetermined), the mono/stereo switch 8 switches from stereo mode to mono mode. In the mono mode, the matrix decoded signals IS1 and IS2, which are both then the sum signal (L+R), may be filtered by the transfer functions $H_R$ and $H_L$, respectively, to provide the stereo signals (L) and (R). Furthermore, the transfer functions $H_R$ and $H_L$ may be changed via a hardware-, software-, or firmware-based mechanism (such as fading or exponential smoothing) from $H_R$=1 and $H_L$=1 to $H_R(f)$ and $H_L(f)$, respectively, as set forth in the equation (3).

As shown in FIG. 2, the example aspect of the SDS may decode the sum signal (L+R) and the difference signal (L−R) using a stereo matrix, thereby providing, based on the quality of a signal (which may be retrieved from the quality signal (QS) representative of the stereo multiplex signal (MPX)). The decoded signals may be the matrix-decoded signals IS1 and IS2 that may represent the left stereo signal (L) and the right stereo signal (R), respectively, where the signal quality is sufficient; or they may represent the sum signal (L+R), where the signal quality is insufficient. Where the matrix-decoded signals IS1 and IS2 represent the left stereo signal (L) and the right stereo signal (R), the example aspect of the SDS may filter the matrix-decoded signals according to a third transfer function, which may include a unity function (where $H_R$=1 and $H_L$=1, for example). Where matrix decoded signals IS1 and IS2 are the sum signal (L+R), the example aspect of the SDS may filter one of the matrix-decoded signals IS1 or IS2 according to a first transfer function; and may filter the other matrix-decoded signal IS2 or IS1 according to a second transfer function. The example aspect of the SDS may also filter the matrix-decoded signals IS1 and IS2 with the third transfer function when the signal is an insufficient quality with respect to a predetermined criterion.

With respect to the example aspect depicted in FIG. 2, stereo signals including fast channel changes between left and right channels and/or vice versa may experience a certain delay time before the aspect reproduces these signals. Optionally, with respect to the example aspect of FIG. 1, the sum signal (L+R) may be adequately delayed by delay element 10, for example. Further, the correlation function or power density spectrum may be simultaneously calculated by the filter controller 5 to minimize delay.

Figure 3:
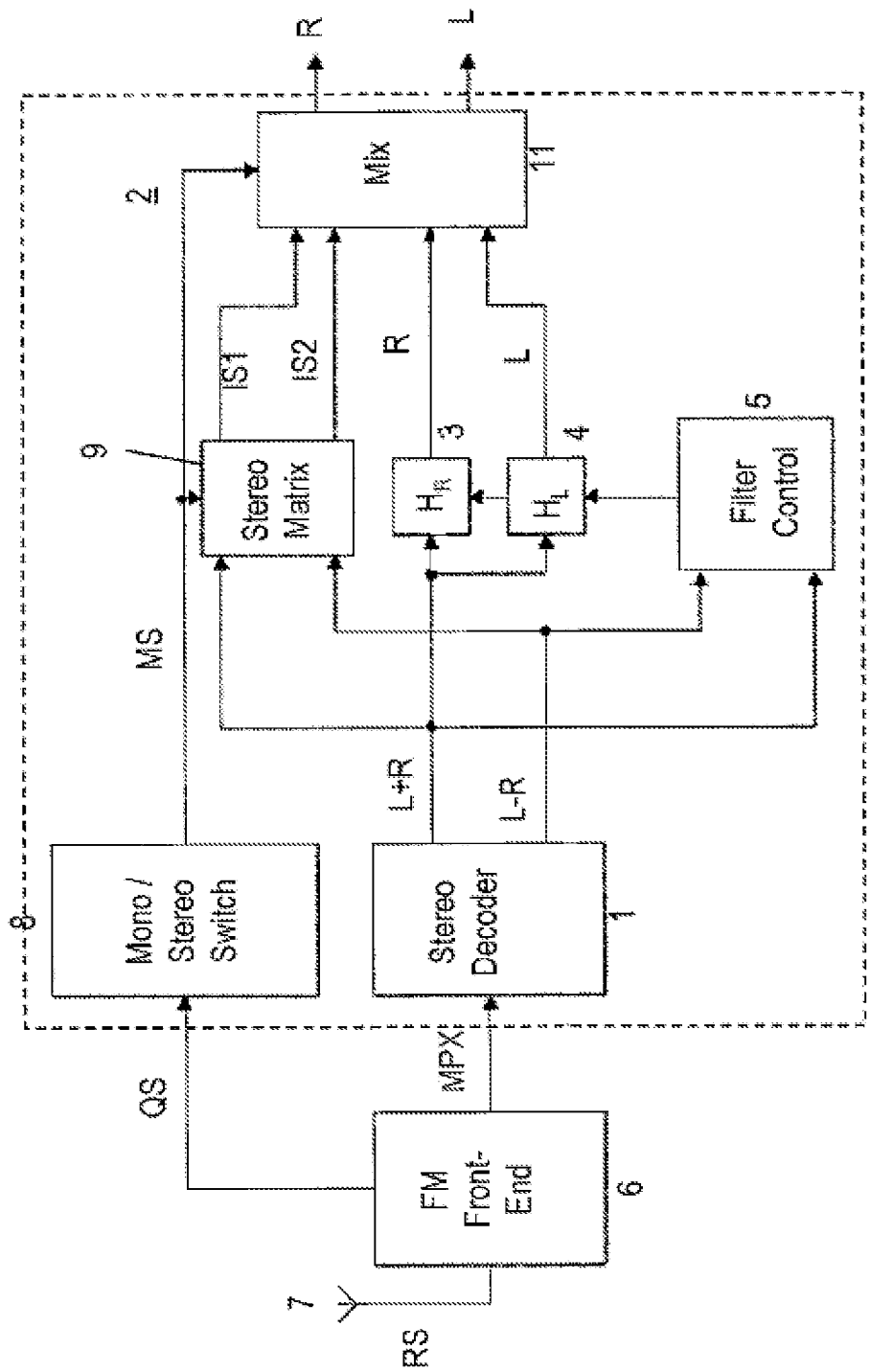
FIG. 3 is a block diagram of an example receiver system employing an example aspect of the SDS, in parallel.

FIG. 3 shows block diagram of an example receiver system employing an example aspect of the SDS. In this example receiver system, the filters 3 and 4 are not connected serially to (or downstream of) the matrix unit 9 as in the example aspect of FIG. 2. In this example receiver system, the filters 3 and 4 are connected in parallel. Further, the filters 3 and 4 may be supplied by the sum signal (L+R), and the matrix unit 9 may be supplied by the sum signal (L+R) and the difference signal (L−R); the filters' outputs and the matrix unit's outputs may be linked together by a mixer unit 11. The mixer unit 11 may be controlled by the mode control signal (MS), so that it can switch or fade between the stereo signals provided by the matrix unit 9 and the stereo signals provided by the filters 3 and 4. The mixer unit 11 may have various time constants and may use hysteresis for fading. For example, fading the output signals from matrix unit 9 to the output signals from filters 3 and 4 may be delayed in order to maintain a natural sound impression. Further, fading may start at different thresholds or hysteresis to avoid signal fluttering that may occur due to stereo signals from the matrix unit 9 and the filters 3 and 4 interfering with each other.

In one example aspect of the SDS, the sum signal (L+R) and the difference signal (L−R) may be correlated. For example, the filter controller 5 may make such correlations.

When no difference signal (L−R) can be demodulated, a pilot signal is not detectable in the multiplex signal (MPX) due to poor receiving conditions or due to transmission of monaural signals, for example. In such a situation, random results may occur due to false estimates of correlation functions. This issue may be remedied by switching the mixer unit 11 into a mono mode or by using the output signals of the matrix unit 9, which are monaural in this case.

Further, the example receiver system shown in FIG. 3 may decode the sum signal (L+R) and the difference signal (L−R) using a stereo matrix, thereby providing the decoded signals IS1 and IS2. Similarly, IS1 and IS2 may be based on the quality signal (QS). Also, similarly, based on the quality of the stereo multiplex signal (MPX) indicated by the quality signal (QS). For example, the stereo multiplex signal (MPX) may switch or fade between the left stereo signal (L) and the right stereo signal (R), resulting from a first criteria (such as undesirable amount of noise and/or signal strength); or the left stereo signal (L) and the right stereo signal (R) may be provided from the matrix decoding, resulting from a second criteria (such as desirable amount of noise and/or signal strength). The example receiver system may also switch or fade the signal between the left stereo signal (L) and the right stereo signal (R), resulting from a first criteria, or provide the sum signal (L+R) via matrix decoding as a result of a second criteria.

Figure 4:
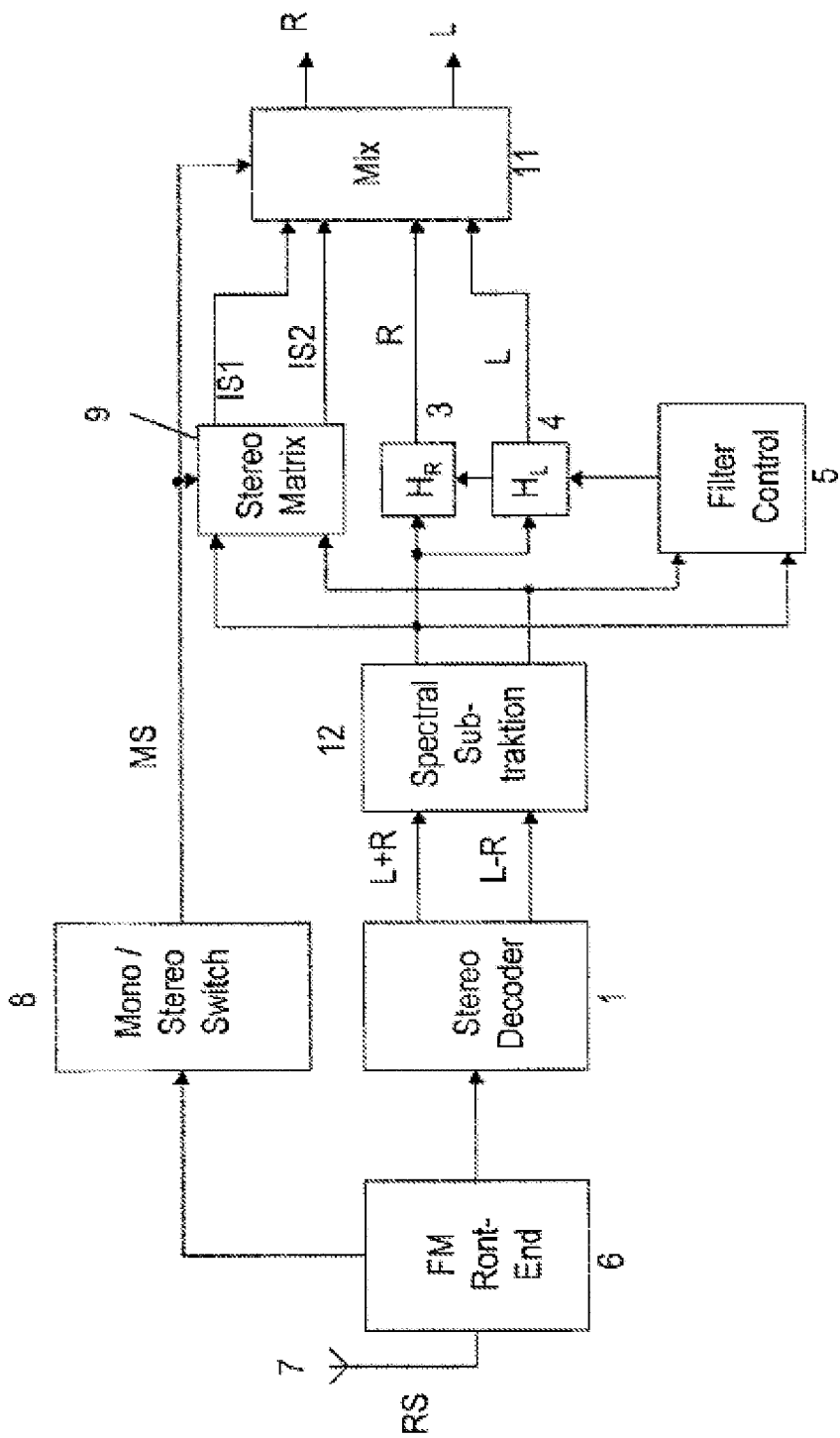
FIG. 4 is a block diagram of an example receiver system employing an example aspect of the SDS in connection with spectral subtraction.

FIG. 4 is a block diagram of another example receiver system employing an example aspect of the SDS in connection with spectral subtraction. In this system, included may be an additional noise reduction unit in a spectral subtraction unit 12 connected downstream of the stereo decoder 1 and upstream of the matrix unit 9, the filter controller 5, and the filters 3 and 4. The spectral subtraction unit 12 providing spectral subtraction reduces broadband noise that results in a lowering of a threshold for determining a switch to mono mode. Furthermore, the reducing the broadband noise also reduces estimation errors when correlating the sum signal (L+R) and the difference signal (L−R). Spectral subtraction involves adjusting the sum signal (L+R) and the difference signal (L−R) with different parameters before they are inputted into the stereo matrix 9. The spectral subtraction may be used on the sum signal (L+R) and the difference signal (L−R) by a Fourier transformation of respective noise signals and determining power density minimum to determine the noise power density for generating the adjusted signals. Details of the spectral subtraction are set forth in DE 101 39 247 C2 or DE 44 45 983 A1.

Figure 5:
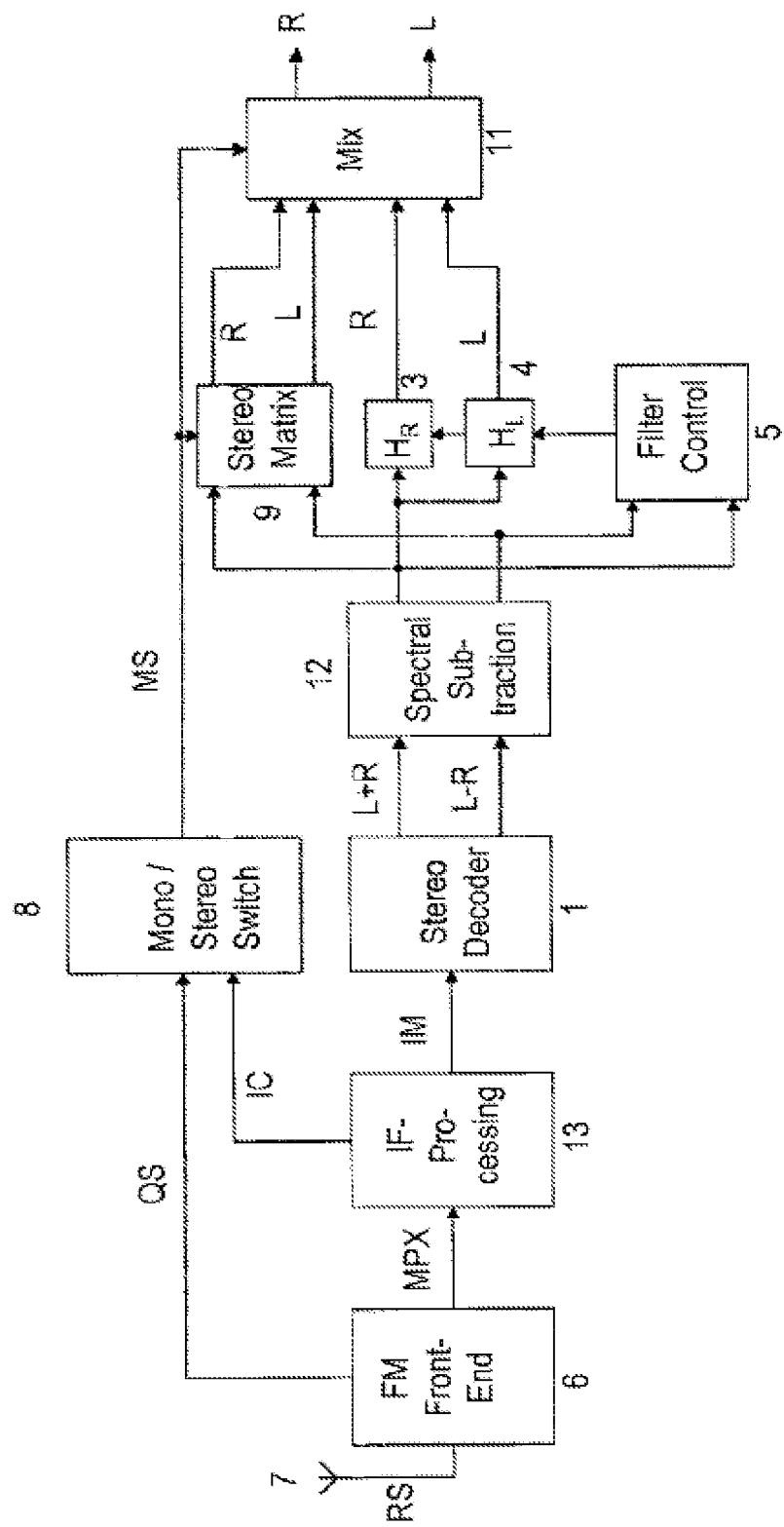
FIG. 5 is a block diagram of an example receiver system employing an example aspect of the SDS in connection with enhanced intermediate signal processing.

FIG. 5 is a block diagram of another example receiver system employing an example aspect of the SDS in connection with enhanced intermediate signal processing. In the system of FIG. 5 an intermediate frequency (IF) processing unit 13 may be added to the system of FIG. 4. The IF processing unit 13, which may be connected between the FM frontend 8 and the stereo decoder 1, may delay an IF multiplex signal (MPX) via a delay line (not shown) or other adequate circuitry. The IF processing unit 13 may also include a signal integrated circuit (IC) for controlling the mono/stereo switch 8. The signal IC may be operate with respect to field strength, noise level, and/or another quality of an input signal. For example, the signal IC may delay the multiplex signal (MPX), which may allow approximating stereo signal behavior. By this approximation, the system of FIG. 5 may accurately switch or smooth fade between other forms of stereo detection by stereo matrix 9 or the stereo detection by filters 3 and 4 in a mono mode.

Although the present invention has been illustrated and described with respect to several example embodiments thereof, various changes, omissions and additions to the form and detail thereof, may be made therein, without departing from the spirit and scope of the invention. For example, the spectral subtraction unit 12 and/or the IF processing unit 13, although only shown in connection with the system shown in FIG. 3, may also be applied to the system of FIG. 2 or any other suitable system.

With respect to the mono and stereo mode, a baseband stereo multiplex signal such as used in frequency modulated (FM) radio broadcast systems, may include sum and difference signals of left and right stereophonic (stereo) signals. A sum signal in its baseband frequency range may be located in a frequency range from 0 to 15 kHz, and a difference signal, being double sideband amplitude-modulated on a suppressed sub-carrier of 38 kHz, may cover a frequency range of 23 to 53 kHz. An amplitude level of both sideband difference signals may correspond to, for example, half of an amplitude level of a sum signal. This example 1:2 ratio may also be referred to as −6 dB difference. A stereo multiplex signal also may include a 19 kHz stereo pilot signal that may serve as a reference frequency during the regeneration of a local 38 kHz mixing carrier. At the receiver's end, the synchronous demodulation of the modulated difference signal into baseband may compensate for this difference in amplitude level, which may allow disentangling these signals in a disentanglement unit into baseband stereo left and stereo right signals.

Due to reception interference, such as adjacent channel interference, multi-path interference, or the like, a difference signal which may be modulated with the 38 kHz carrier (subcarrier) signal may be more distorted than a baseband sum signal (the upper sideband is most affected). However, at outputs of the disentanglement unit distortions may appear in both the stereo left and stereo right signals, since $L=0.5((L+R)+(L-R))$ and $R=0.5((L+R)-(L-R))$.

One approach to reducing or suppressing reception interference may be to switch to the mono mode (such as a monaural reproduction mode) if the signal quality of the stereo multiplex signal falls below a certain level. In the monaural reproduction mode, the less distorted sum signal may be reproduced on both channels to the effect that the aural impression of a listener deteriorates. To limit such deterioration, the SDS may switch to the stereo mode.

Figure 6:
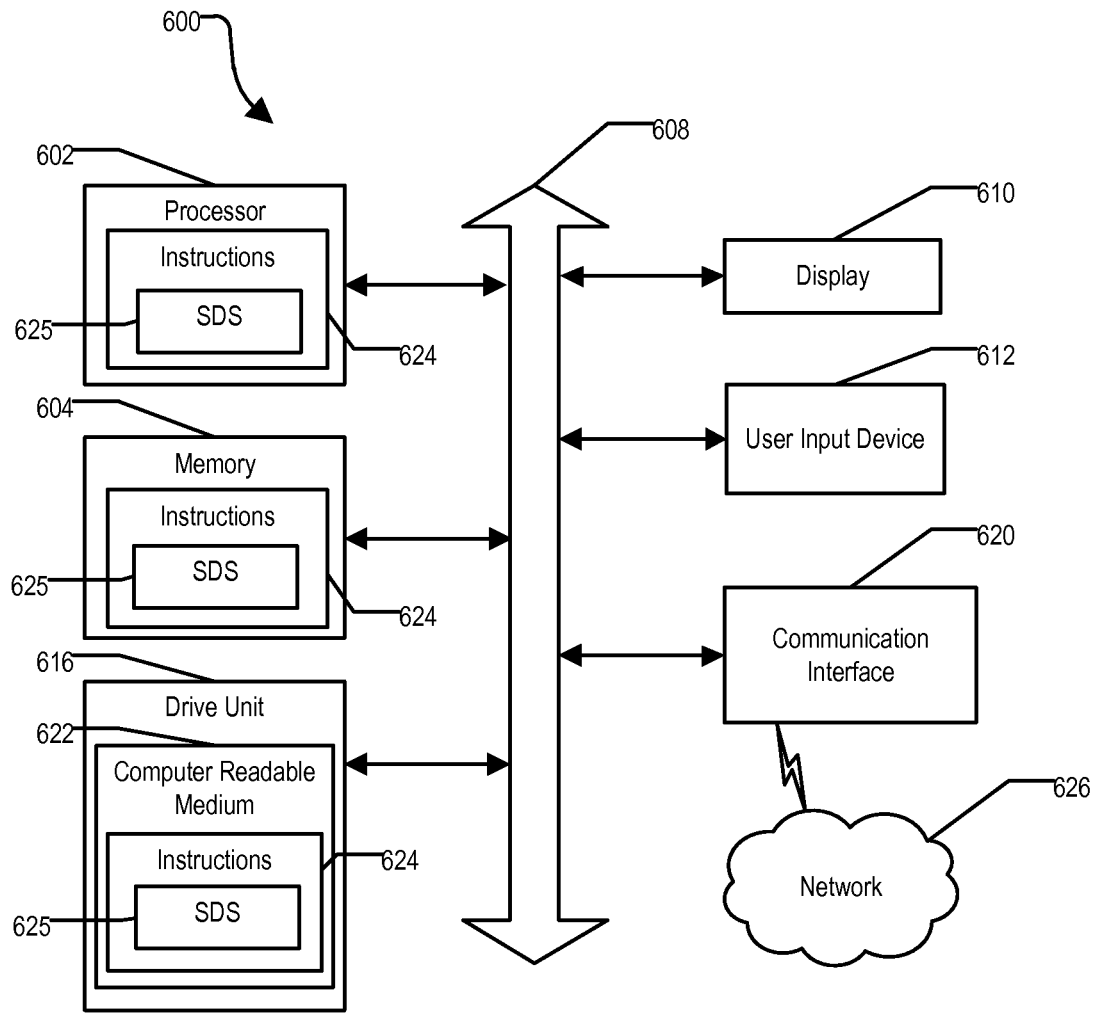
FIG. 6 is a block diagram of an example computer system that may be included or used with an aspect of the SDS.

Furthermore, the SDS, one or more aspects of the SDS, or any other device or system operating in conjunction with the SDS may include a portion or all of one or more computing devices of various kinds, such as the computer system 400 in FIG. 6. The computer system 600 may include a set of instructions that can be executed to cause the computer system 600 to perform any one or more of the methods or computer based functions disclosed. The computer system 600 may be implemented using electronic devices that provide voice, audio, video or data communication. While a single computer system 600 is illustrated, the term "system" may include any collection of systems or sub-systems that individually or jointly execute a set, or multiple sets, of instructions to perform one or more computer functions.

The computer system 600 may include a processor 602, such as a central processing unit (CPU), a digital signal processor, or some combination of different or the same processors. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually or programmed.

The term "module" may be defined to include a plurality of executable modules. The modules may include software, hardware, firmware, or some combination thereof executable by a processor, such as processor 602. Software modules may include instructions stored in memory, such as memory 604, or another memory device, that may be executable by the processor 602 or other processor. Hardware modules may include various devices, components, circuits, gates, circuit boards, and the like that are executable, directed, or controlled for performance by the processor 602.

The computer system 600 may include a memory 604, such as a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 604 includes a cache or random access memory for the processor 602. In alternative examples, the memory 604 may be separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described may be performed by the programmed processor 602 executing the instructions stored in the memory 604. The functions, acts or tasks may be independent of the particular type of instructions set, storage media, processor or processing strategy and may be performed by software, hardware, integrated circuits, firm-ware, micro-code and the like, operating alone or in combination Likewise, processing strategies may include multiprocessing, multitasking, parallel processing and the like.

A computer readable medium or machine readable medium may include any non-transitory memory device that includes or stores software for use by or in connection with an instruction executable system, system, or device. The machine readable medium may be an electronic, magnetic, optical, electromagnetic, infrared, or semiconductor system, system, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 600 may include an input device 612 configured to allow a user to interact with any of the components of computer system. The input device 612 may be a keypad, a keyboard, or a cursor control device, such as a mouse, or a joystick, touch screen display, remote control or any other device operative to interact with the computer system 600.

The computer system 600 may include a disk or optical drive unit 616. The disk drive unit 616 may include a computer-readable medium 622 in which one or more sets of instructions 624 or software can be embedded. The instructions 624 may embody one or more of the methods or logic described herein, including software aspects of the SDS 625. The instructions 624 may reside completely, or partially, within the memory 604 or within the processor 602 during execution by the computer system 600. The memory 604 and the processor 602 also may include computer-readable media as discussed above. Also, the instructions 624 may be communicated to other modules of the computer system 600 using a bus 608.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 600 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various aspects of the SDS. One or more examples described may implement functions using two or more specific interconnected hardware modules or devices with related control and data signals that can be communicated between and through modules, or as portions of an application-specific integrated circuit. The SDS may encompass software, firmware, and hardware implementations.

The SDS described may be implemented by software programs executable by a computer system. Implementations can include distributed processing, component/object distributed processing, and parallel processing. Alternatively, virtual computer system processing can be constructed to implement various aspects of the SDS.

The SDS is not limited to operation with any particular standards and protocols. For example, standards for Internet and other packet switched network transmission (such as TCP/IP, UDP/IP, HTML, and HTTP) may be used. Replacement standards and protocols having the same or similar functions as those disclosed may also or alternatively be used.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it may be apparent to those of ordinary skill in the art that many more embodiments and implementations are possible within the scope of the invention. Accordingly, the invention is not to be restricted except in light of the attached claims and their equivalents.

We claim:

1. A method for decoding a stereo multiplex signal, comprising:

converting the stereo multiplex signal into a sum signal (L+R) and a difference signal (L−R), where the sum signal and the difference signal are derived from a left stereo signal (L) and right stereo signal (R);

determining a first transfer function $H_L(f)$ and a second transfer function $H_R(f)$ from the sum signal (L+R) and the difference signal (L−R), wherein the first transfer function $H_L(f)$ and the second transfer function $H_R(f)$ are each variable and adjustable;

adaptively filtering the sum signal (L+R) by modifying first filter coefficients according to the first transfer function to provide the left stereo signal (L); and adaptively filtering the sum signal (L+R) by modifying second filter coefficients according to the second transfer function to provide the right stereo signal (R).

2. The method of claim 1, where the second transfer function is defined by $$H_R(f) = 1 - \frac{L_{xy}}{2L_{xx}} + \sqrt{\frac{\left(\frac{L_{xy}}{L_{xx}} - 2\right)^2 - 3 - \frac{L_{yy}}{L_{xx}} + \frac{4L_{xy}}{L_{xx}}}{4}} \; ;$$

where $L_{xx}$, $L_{yy}$, and $L_{xy}$ are power density spectra of $1_{xx}(\tau)$, $1_{yy}(\tau)$ and $1_{xy}(\tau)$, respectively;

where $1_{xx}(\tau)$ and $1_{yy}(\tau)$ are auto-correlation functions of x(t) and y(t), respectively; and where x(t) represents the sum signal (L+R) and y(t) represents the difference signal (L−R).

3. The method of claim 1, where the first transfer function $H_L(f)=1$ the second transfer function $H_r(f)$.

4. The method of claim 1, further comprising:
decoding the sum signal (L+R) and the difference signal (L−R) with a stereo matrix; and providing decoded signals from the decoded sum signal (L+R) and the decoded difference signal (L−R).

5. The method of claim 4, further comprising filtering the decoded sum signal (L+R) and the decoded difference signal (L−R) according to a third transfer function, where the decoded signals include the left stereo signal (L) and the right stereo signal (R).

6. The method of claim 5, where the third transfer function includes a unity function.

7. The method of claim 4, further comprising filtering one of the decoded sum signal (L+R) and the decoded difference signal (L−R) according to the first transfer function and filtering the other decoded signal according to the second transfer function, where the decoded signals include a part of to the sum signal (L+R).

8. The method of claim 7, further comprising
switching or fading the decoded sum signal (L+R) and the decoded difference signal (L−R) to the filtered decoded sum signal (L+R) and filtered decoded the difference signal (L−R), respectively.

9. The method of claim 1, further comprising noise reducing the sum signal (L+R) and the difference signal (L−R).

10. The method of claim 9, where the noise reducing includes spectral subtracting.

11. The method of claim 1, further comprising delaying the stereo multiplex signal.

12. A system for decoding a stereo multiplex signal, comprising:
a stereo decoder that converts the stereo multiplex signal into a sum signal (L+R) and a difference signal (L−R);
a first filter that is connected to the stereo decoder and that is operable to filter the sum signal (L+R) according to a first transfer function to provide a left stereo signal (L);
a second filter that is connected to the stereo decoder and that is operable to filter the sum signal (L+R) according to a second transfer function to provide a right stereo signal (R); and
a filter control unit that is connected to the stereo decoder and that is operable to control the first filter and the second filter by providing modified filter coefficients as control signals representing the first transfer function and the second transfer function, respectively,
wherein the first filter and the second filter are adaptive, and
wherein the first transfer function and the second transfer function are each variable and adjustable.

13. The system of claim 12, further comprising:
a receiver front end unit that is connected upstream of the stereo decoder and that is configured to receive the stereo multiplex signal and a quality signal representing the quality of the stereo multiplex signal with respect to at least one of signal strength or noise level;
a mono/stereo switch that is connected to the receiver front end unit and that is configured to evaluate the quality signal with respect to at least one of the signal strength or the noise level and provide a mode control signal indicating a mono mode or a stereo mode; and
a stereo matrix unit that is connected to the stereo decoder and the first and the second filter, the stereo matrix unit configured to provide to decoded signals, where the decoded signals represent the left stereo signal (L) and the right stereo signal (R) due to the quality signal indicating a high quality signal, and where the decoded signals represent the sum signal (L+R) due to the quality signal indicating a low quality signal.

14. The system of claim 13, where the stereo matrix unit is operable to filter the decoded signals according to a third transfer function, in response to the decoded signals representing the left stereo signal (L) and the right stereo signal (R).

15. The system of claim 14, where the third transfer function includes a unity function.

16. The system of claim 13, further comprising an intermediate frequency (IF) processing unit that is connected downstream of the receiver front end unit and that is configured to delay the stereo multiplex signal.

17. The system of claim 13, where the stereo matrix unit is operable to filter one of the decoded signals according to the first transfer function and filter another decoded signal according to the second transfer function, in response to the decoded signals representing the sum signal (L+R).

18. The system of claim 17, where the stereo matrix unit is operable to switch or fade the decoded sum signal (L+R) and the decoded difference signal (L−R) to the filtered decoded sum signal (L+R) and the filtered decoded difference signal (L−R), respectively.

19. The system of claim 12, further comprising a noise reduction unit that is connected downstream of the stereo decoder and is configured to reduce noise contained in the sum signal (L+R) and the difference signal (L−R).

20. A non-transitory computer readable storage medium storing computer readable instructions executable by a processor to decode a stereo multiplex signal, the computer readable medium comprising instructions to:
convert the stereo multiplex signal into a sum signal (L+R) and a difference signal (L−R), where the sum signal and the difference signal are derived from a left stereo signal (L) and right stereo signal (R);
determine a first transfer function $H_L(f)$ and a second transfer function ($H_R(f)$) from the sum signal (L+R) and the difference signal (L−R), wherein the first transfer function $H_L(f)$ and the second transfer function $H_R(f)$ are each variable and adjustable;
adaptively filter the sum signal (L+R) by modifying first filter coefficients according to the first transfer function to provide the left stereo signal (L); and
adaptively filter the sum signal (L+R) by modifying second filter coefficients according to the second transfer function to provide the right stereo signal (R).

* * * * *